May 15, 1951      H. HENKE      2,553,454

DUMPING APPARATUS FOR VEHICLES

Filed June 28, 1946      4 Sheets-Sheet 1

Inventor
Henry Henke,
By [signature]
his Attorney

May 15, 1951  H. HENKE  2,553,454

DUMPING APPARATUS FOR VEHICLES

Filed June 28, 1946  4 Sheets-Sheet 2

Inventor
Henry Henke,
By
his Attorney

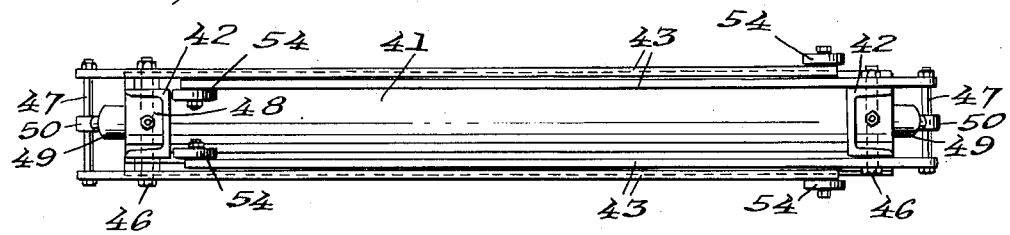
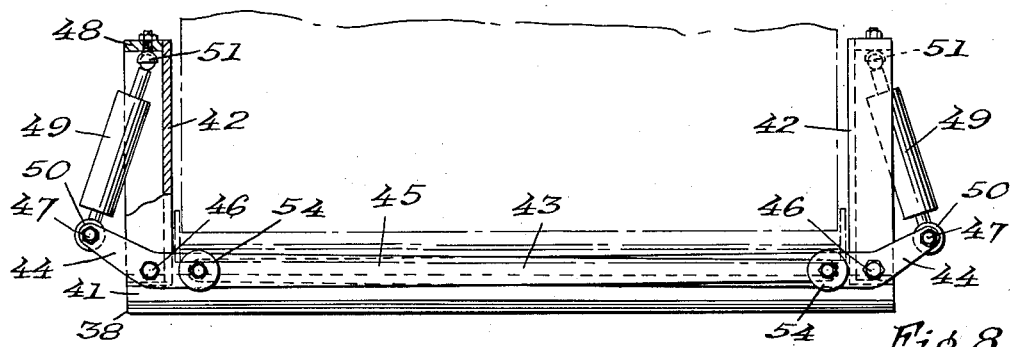
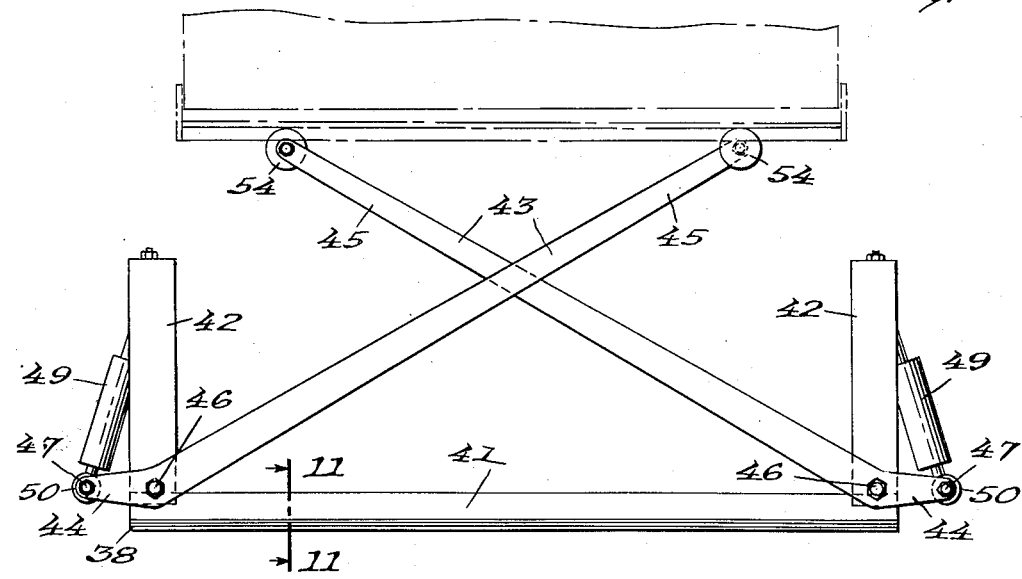

May 15, 1951 H. HENKE 2,553,454
DUMPING APPARATUS FOR VEHICLES
Filed June 28, 1946 4 Sheets-Sheet 4
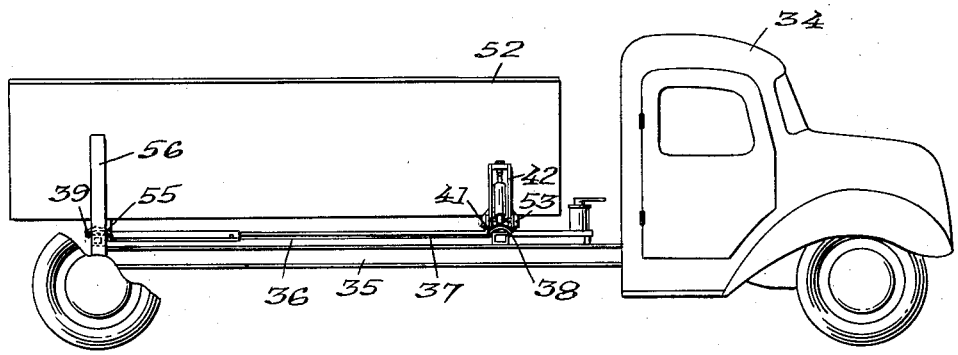
Fig. 5
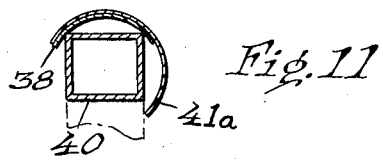
Fig. 11
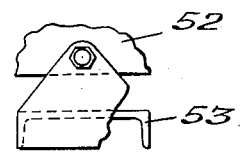
Fig. 12
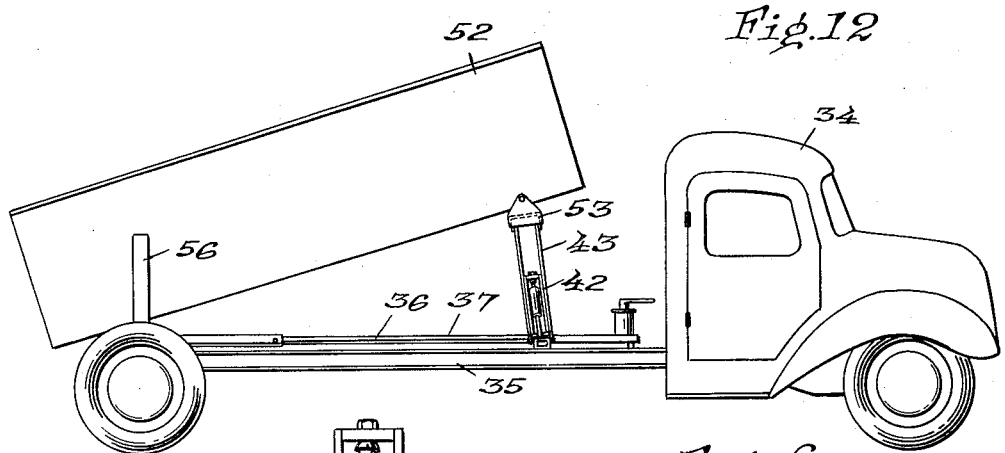
Fig. 6
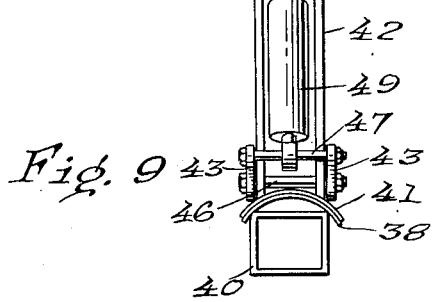
Fig. 9
Inventor
Henry Henke,
his Attorney Patented May 15, 1951

2,553,454

UNITED STATES PATENT OFFICE 2,553,454

DUMPING APPARATUS FOR VEHICLES

Henry Henke, Columbus, Nebr.

Application June 28, 1946, Serial No. 680,234

12 Claims. (Cl. 298—19)

This invention relates generally to hoisting apparatus and particularly to apparatus for dumping vehicle bodies.

The primary object of the invention is to provide a dumping apparatus applicable as a unit beneath the body of a vehicle for converting the vehicle into a dump vehicle.

Another object of the invention is to provide a frame having mounted thereon lifting mechanism, the frame and associated mechanism being adapted to be mounted as a unit on the cross ties of the running gear of a wagon whereby the wagon is converted into a dump wagon.

A further object of the invention is to provide a self-contained hydraulic dumping apparatus mountable as a unit between the body and running gear of a vehicle whereby the body is converted into a hydraulically operated dump body.

An additional object of the invention is to provide dumping apparatus mountable as a unit on a vehicle and having an adjustable frame whereby the same unit can be employed successively with vehicles having bodies of different size.

Another object of the invention is to provide a hydraulic body dumping unit for vehicles which is light in weight, inexpensive, and easily operable whereby non-powered vehicles such as farm wagons can be converted economically into dump wagons.

Other objects and advantages of the invention will appear hereinafter in the detailed description and be particularly pointed out in the appended claims.

In the drawings, illustrating two embodiments of the invention:

Figure 5 is a side elevational view of another embodiment of the dumping apparatus showing the apparatus mounted on a truck between its running gear and body, the truck being illustrated diagrammatically.

Figure 6 is a side elevational view of the truck of Figure 5 showing the body in lifted or dumping position.

Figure 7 is a plan view on an enlarged scale of the hoisting mechanism of the dumping apparatus shown in Figure 5.

Figure 8 is a side elevational view of the hoisting mechanism of Figure 5 showing the lifting arms in lowered position, with portions broken away to more clearly illustrate certain of the details of construction.

Figure 9 is an end elevational view of the hoisting mechanism shown in Figure 7.

Figure 10 is a side elevational view of the hoisting mechanism of Figure 7 showing the lifting arms in raised position; and Figure 11 is a vertical sectional view taken along lines 11—11 of Figure 10 and on an enlarged scale, showing the details of the connection between the hoisting mechanism and the frame of the dumping apparatus, the latter being shown mounted on a cross tie of the truck.

Figure 12 is a side elevational view showing the connection between the guide channel and the truck body.

Figure 1:
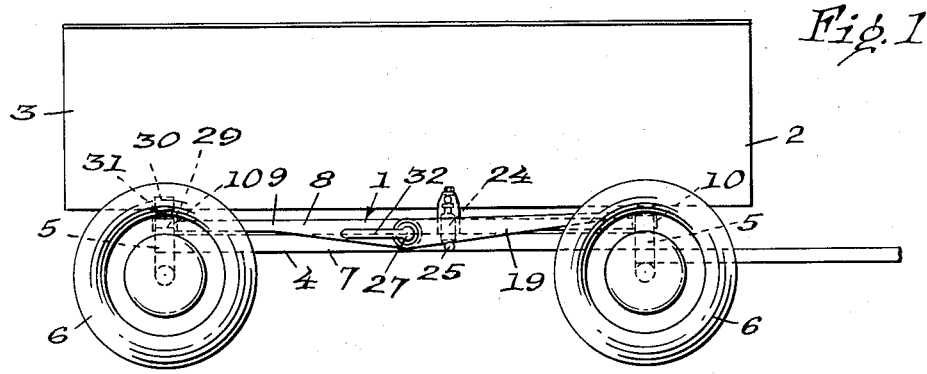
Figure 1 is a diagrammatically illustrated wagon in side elevation showing one embodiment of the dumping apparatus of the present invention mounted between the running gear and body of the wagon.
Figure 2:
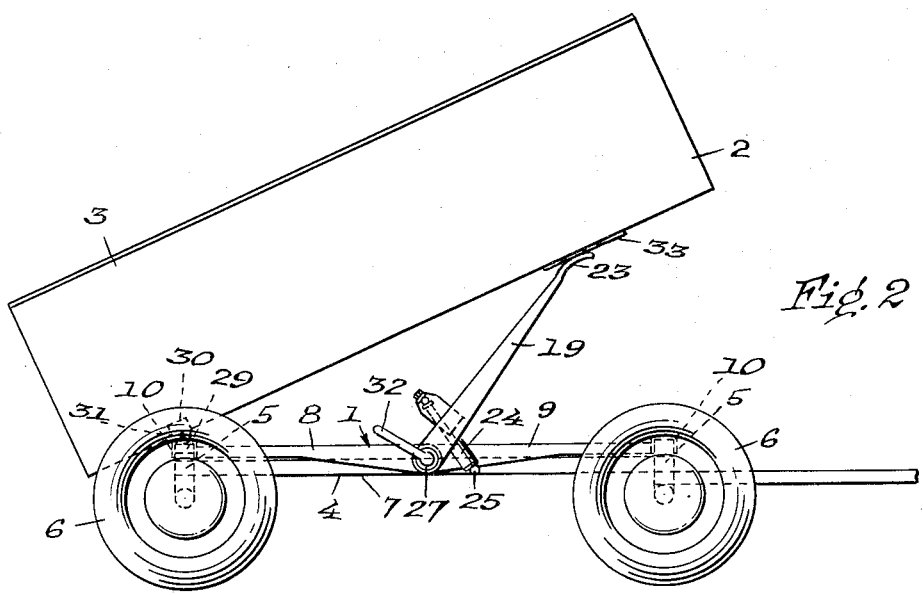
Figure 2 is a side elevational view of the wagon of Figure 1 with the body shown in lifted or dumping position.
Figure 3:
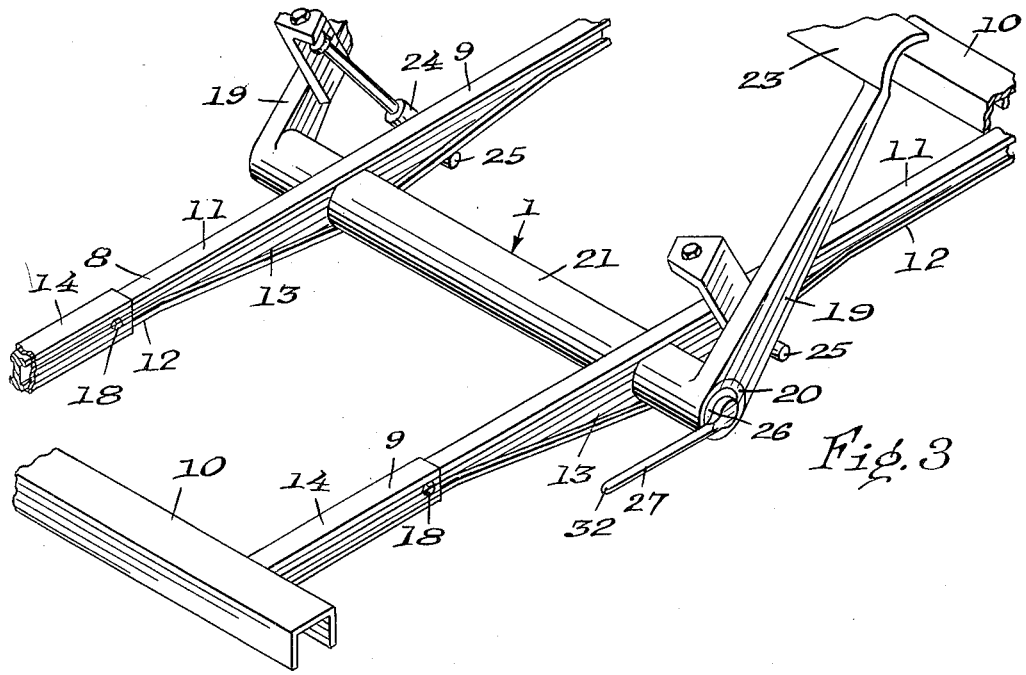
Figure 3 is an isometric view on an enlarged scale of the dumping apparatus of Figure 1 with portions broken away.
Figure 4:
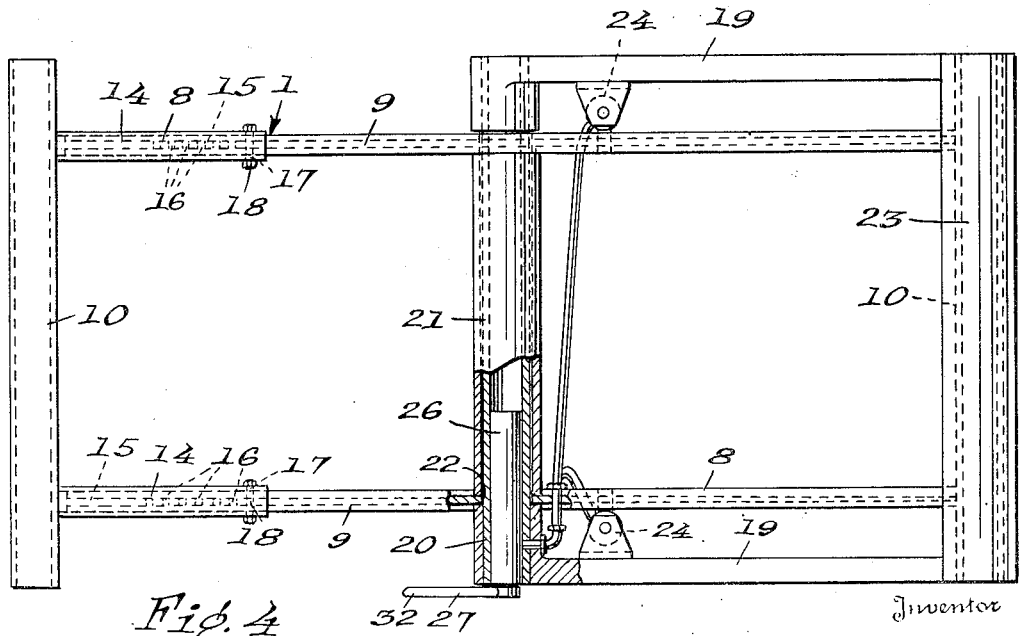
Figure 4 is a plan view of the dumping apparatus of Figure 3 on the same scale with portions broken away to more clearly illustrate certain details of construction.

Referring now in detail to the drawings in which like reference characters indicate like parts, and first to the embodiment of the invention shown in Figures 1 through 4, the improved dumping apparatus is designated generally as 1. While designed for use with wheeled vehicles of various types and sizes, for purposes of illustration the dumping apparatus has been shown applied to a vehicle 2 of the farm wagon type in which a box body 3 is supported by running gear or undercarriage 4, the latter comprising front and rear bolsters 5 mounted on wheels 6 and connected by a single connecting bar or reach 7. The dumping apparatus is provided with a frame 8, preferably of metal, consisting of a pair of spaced longitudinal members or side rails 9 which are connected adjacent their opposite ends by a pair of transverse members or end rails 10.

The longitudinal members are preferably I-beams, although T-beams, tubes or other shapes having the required strength can be employed. Using the preferred construction, the upper and lower flanges, 11 and 12, respectively, of each of the I-beams are parallel adjacent its ends. Intermediate the ends of each beam the lower flange diverges from the upper flange, the connecting web 13 reaching a maximum depth at a point to be hereinafter more fully described.

The transverse members 10, to which the ends of the longitudinal members 9 are attached by welding or other suitable means, are desirably inverted U-shaped or channel beams having concave lower faces. This construction both provides the necessary strength and enables the transverse members to embrace, engage, hook or seat on the axles, bolsters or other cross ties 5 of the running gear 4 of the wagon or other vehicle 2.

To enable the dumping apparatus to be employed with vehicles having bodies of different size the frame 8 is made longitudinally adjustable. This can be accomplished readily by forming the portions of the longitudinal members 9, adjacent one end of the frame, as box members 14 for slidably receiving or surrounding the ends of the I-beams 15 constituting the main part of the longitudinal members. Longitudinal adjustment can be made as desired by providing a series of holes 16 adjacent the free or rear end of each of the I-beams and one or more holes 17 adjacent the forward end of each of the box members. Bolts 18 can then be inserted through the holes in the box members and selected holes in the I-beams to provide a frame of the required length.

Although the frame 8 will normally be applied to a vehicle by hooking the front and rear transverse members 10 over correspondingly disposed cross ties on the vehicle's running gear, the frame is also adapted to be mounted on running gear in which the front and rear wheels are connected by a rigid underframe having spaced longitudinal members or side frames. For the latter purpose, the ends of the transverse members 4 are extended substantially beyond the longitudinal members 3, enabling them to engage or rest on the side rails of the vehicle underframe and support the frame 8 of the dumping apparatus therebetween.

The lifting or hoisting mechanism of the dumping apparatus comprises a pair of lifting, hoisting, elevating or body supporting arms 19 extending longitudinally of the frame 8, and preferably spaced outwardly of the longitudinal members 9 on opposite sides of the frame. The arms are pivotally mounted, attached or connected to the longitudinal members intermediate the ends of the latter and extend substantially parallel thereto toward one of the transverse members 10. While individual stub shafts could be employed, the pivotal mounting is preferably obtained through a transverse shaft, rod or bar 20, to the opposite ends of which the inner or pivotal ends of the arms are attached or secured by welding or other suitable means. The shaft is preferably housed or journaled in a hollow tube or supporting member 21 which extends between and connects the longitudinal members 9 and is attached thereto by welding or other means at the points where the webs 13 reach their greatest depth, openings 22 being cut through the webs to permit the ends of the shaft 20 to project therethrough. For lightness in weight, as well as economy in manufacture, both the shaft and supporting member may be made from standard tubing of the desired dimensions. The outer ends of the arms 19 are joined by a transverse shoe or bearing plate 23 to which they are rigidly secured, the shoe in the normal or lowered position of the arms overlying and resting on the adjoining or front transverse member 10.

Actuating means for raising or extending the arms 19 is provided by a pair of jacks 24, preferably hydraulic, mounted on the side rails 9 adjacent the pivotal ends of the arms and intermediate the supporting member 21 and the front transverse member 10. The jacks can be mounted directly on the side rails but are preferably offset therefrom on brackets or other supports 25 to underlie the arms. The jacks are secured at their upper extremities to the arms, their connections to both the arms and the frame being pivotal to enable them to pivot or swing as they actuate and raise or lower the arms. Although an outside source of power may be employed, the jacks are readily operable by a hydraulic cylinder or reservoir 26 and its operating pump 27 which can be housed conveniently in one end of the hollow shaft 20 and connected through suitable piping 28 to the jacks.

In applying the dumping apparatus to a wagon or other vehicle, the body or box 3 of the wagon is first removed. The dumping apparatus is then mounted on the running gear of the vehicle either by hooking the front and rear transverse members 10 to the corresponding axles, bolsters or cross ties 5 of the vehicle or, in the case of a vehicle having rigid side frames, resting the projecting portions of the transverse members 10 on the side frames, the frame 8 of the apparatus having been adjusted in process to the desired length. The body 3 is then replaced or remounted on the running gear over the dumping apparatus.

To prevent slipping of the body relative to the running gear 4, particularly while the body is being hoisted or raised, the body is hingedly or rotatably connected to its running gear. This can be accomplished by suitable means such as mounting a pair of upstanding brackets 29 over the rear axle of the vehicle either on the running gear or on the frame 8 and a pair of co-operating brackets 30 adjacent the rear end of the body, the brackets being connected for relative pivotal movement by a cross rod 31. The forward end of the body then can be raised or lowered as desired by manual operation of the handle 32 of the pump 27 or through appropriate controls mounted on the vehicle when a separate power source is used. To prevent excessive wear of the vehicle body when used as a dump body, it is desirable to attach a wear plate 33 to that portion of the underside of the front of the body which is engaged by the shoe 23 as the body is raised and lowered.

In Figures 5 to 11 a second embodiment of the invention is shown applied for purposes of illustration to a vehicle 34 having a rigid framed running gear 35. In this embodiment, the dumping apparatus has a frame 36 formed of a pair of spaced longitudinal members or side rails 37 which are preferably made of pipe or tubing and are telescopable adjacent one of their ends to permit longitudinal adjustment to the frame. The opposite ends of the side rails are attached by welding or other suitable means to front and rear transverse members, end rails or spacers, 38 and 39 respectively. The spacers are preferably partly cylindrical in section, providing concave lower faces for engaging, embracing or hooking over the corresponding axles, bolsters or cross ties 40 on the running gear 35 of the wagon or other vehicle 34.

The lifting or hoisting mechanism of the dumping apparatus is mounted on the forward end of the frame 36 and consists of a base or supporting member 41 which extends transversely of the frame and is carried on or attached to the front spacer 38. The supporting member is preferably U-shaped or partly cylindrical, its lower face being concave and adapted to embrace and rotatively engage the upper correspondingly curved substantially coaxial convex face of the front spacer. Suitable means are provided for connecting the front spacer and the supporting member to prevent displacement of the latter. As shown in Figure 11, this can be accomplished by extending the cylindrically curved supporting member intermediate its ends to form a forwardly projecting lip or horn 41a. The bolster or cross tie 40 then functions as a stop to limit the rotative movement of the supporting member, the lip being of sufficient arc to maintain engagement between the supporting member and the spacer throughout this movement.

The supporting member 41 projects outwardly beyond the ends of the front transverse spacer 38 and carries adjacent each end uprights or brackets 42, the uprights extending perpendicularly of and being rigidly attached to the supporting member by welding or other suitable means. The uprights are preferably formed as outwardly facing channel members closed at their upper ends.

Also mounted on the supporting member are lifting, hoisting, elevating or body supporting arms 43. While a pair of individual arms or arms pivotally connected in toggle form would suffice, the preferred construction comprises two pairs of arms extending transversely of the frame 36 substantially parallel to the supporting member 41. The arms are desirably formed as bent levers with their outer or shorter legs 44 angularly disposed upwardly relative to their inner or longer legs 45 to avoid interference with other structure. The arms are pivotally attached or connected thereto by transverse pins or other attaching means 46 which are preferably anchored in or project through the base portions of the uprights 42. The arms of each pair are horizontally spaced and lie on opposite sides of the supporting member, those of one pair being disposed outwardly of the arms of the other pair to enable them to overlap without interference. The longer or inner legs 45 of each pair of arms extend along the supporting member inwardly of their fulcrums or pivotal points, preferably terminating short of the opposite pivot pins 46. The shorter or outer legs 44 of each pair of arms extend beyond the ends of the supporting member 41 and are rigidly connected adjacent their ends by a cross bar or link 47 which is spaced below the outwardly projecting web, flange or ear 48 forming the top of the adjoining upright 42.

Extending between and connecting each of the cross bars 47 and its associated upright 42 is a jack or arm actuating means 49, preferably hydraulically operated. The jacks are substantially vertically disposed and are pivotally or swivelly attached to both the cross bars and the uprights by appropriate means. As illustrated in the drawings this can be accomplished by the provision of ring connections 50 between the bases of the jacks and the cross bars and ball and socket connections 51 between the upper ends of the jacks and the uprights. Operation of the jacks will cause the arms to pivot about their fulcrums, the inner ends of the inner legs 45 extending or moving upwardly as the outer ends of the outer legs 44 are forced downwardly by the pressure of the jacks against the cross bars.

In applying the dumping apparatus to a vehicle, the body 52 of the vehicle is removed and the dumping apparatus then mounted on the running gear with the front and rear transverse spacers 38 and 39 embracing te axles, bolsters or other cross ties 40 of the running gear. The body is then remounted and replaced over the running gear with its forward portion resting on the supporting member 41 and its rear portion carried by the rear transverse spacer 39. Before the body is replaced there is desirably attached to that portion of its underside which will overlie the supporting member a guide channel or wear plate 53 in the form of an inverted channel iron which is preferably hingedly attached to the body and acts as a guide or track for the upper ends of the arms as the body is raised, as well as reduces wear of the body. Both wear and resistance to relative movement of the body and arms can be further reduced by attaching engaging rollers or wheels 54 to the upper ends of the arms. Additionally, an arcuately concave connecting plate 55 is preferably attached to the rear portion of the underside of the body, this plate being adapted to seat on and rotate relative to the rear transverse spacer 39, thereby serving to connect the body and the frame 36 of the dumping apparatus and prevent relative longitudinal movement therebetween. If desired, lateral movement or shifting of the body and dumping apparatus relative to the running gear of the vehicle can be prevented by mounting confining stanchions or posts 56 on opposite sides of the rear portion of the running gear outwardly of the dumping apparatus and body.

After the dumping apparatus has been attached to the running gear of the vehicle and the body remounted, the forward portion of the body can be raised at will to dump the body's contents by operation of the jacks 49. As the inner legs 45 of the lifting arms are forced upwardly or extended by the jacks, the upper ends of the arms are guided in the channel 53 and move backwardly in an arc with the body thereby causing the supporting member 41 to rotate on the front spacer 38 and hold the arms substantially perpendicular to the body throughout their movement.

During this movement the channel 53 by virtue of its hinged connection with the body, will compensate for changes in the angular disposition of the arms relative to the body to maintain engagement with the rollers 54 and support the body equally on the arms.

As in the case of the first embodiment, this embodiment can be operated either by mounting a hydraulic power source on the frame 36 or by providing appropriate fittings by which the jacks 49 can be connected to an outside source of power.

While designed primarily for non-powered vehicles, both of the illustrated embodiments of the invention can be applied to any vehicle having a box-type body, whether powered or not and regardless of the size of the vehicle body or of the character of its running gear. The invention thus provides a unitary light-weight structure which can be produced inexpensively and employed to convert any vehicle having a box-type body into a dump vehicle by interposing the dumping apparatus between the body and running gear of the vehicle. Not only is the dumping apparatus useful on vehicles of various types and sizes but it can be applied successfully to any number of vehicles, enabling one unit to be employed to convert a vehicle into a dump vehicle for a particular job and subsequently applied to other vehicles as the need arises.

It will be apparent from the above detailed description of the invention that there has been provided dumping apparatus having numerous advantages. It should be understood that the disclosed embodiments are merely illustrative of the invention and that all modifications are intended to be included that depart neither from the spirit of the invention nor the scope of the appended claims.

Having thus described my invention, I claim:

1. Dumping apparatus for vehicles comprising a frame having spaced downwardly opening substantially U-shaped transverse members adapted to engage and be supported on running gear of a vehicle, means for adjusting the length of said frame, and lifting means mounted on said frame, said frame and associated means being adapted to be interposed as a unit between the body and running gear of a vehicle.

2. Dumping apparatus for vehicles comprising a frame having spaced downwardly opening substantially U-shaped transverse members adapted to engage and be supported on running gear of a vehicle, means for adjusting the length of said frame, lifting means mounted on said frame, and means carried by said frame for actuating said lifting means, said frame and associated means being adapted to be interposed between the body and running gear of a vehicle.

3. Dumping apparatus adapted to be mounted as a unit between the body and running gear of a vehicle comprising a frame formed of spaced longitudinal members connected adjacent their opposite ends by transverse members, said transverse members having concave lower faces for embracing longitudinally spaced cross ties on the running gear of said vehicle, a supporting member carried by said frame, lifting arms pivotally connected to said supporting member for engaging and lifting the forward portion of said vehicle body, and means on said frame for raising said lifting arms.

4. Dumping apparatus adapted to be mounted as a unit between the body and running gear of a vehicle comprising a frame formed of spaced longitudinal members connected adjacent their opposite ends by downwardly opening substantially U-shaped transverse members, said transverse members being adapted to engage the running gear of said vehicle and support said frame thereon, an arcuate supporting member carried by and extending transversely across said frame, lifting arms pivotally connected to said supporting member outwardly of said longitudinal members for engaging and lifting the forward portion of said vehicle body, and means on said frame for raising said lifting arms.

5. Dumping apparatus adapted to be mounted as a unit between the body and running gear of a vehicle comprising a frame formed of spaced longitudinal members connected adjacent their opposite ends by downwardly opening substantially U-shaped transverse members, said transverse members being adapted to engage the running gear of said vehicle to support said frame thereon, lifting means pivotally mounted on said frame for lifting the forward portion of said vehicle body, and means on said frame for actuating said lifting means.

6. Dumping apparatus adapted to be mounted as a unit between the body and running gear of a vehicle comprising a frame formed of spaced longitudinal members connected adjacent their opposite ends by transverse members, said transverse members being arranged and constructed to engage and interfit with spaced cross members the running gear of said vehicle for locking said frame thereon, lifting arms pivotally connected to said frame for lifting the forward portion of said vehicle body, hydraulic means mounted on said frame for actuating said lifting arms, and means associated with said frame for operating said hydraulic actuating means.

7. Dumping apparatus adapted to be mounted as a unit between the body and running gear of a vehicle comprising a frame formed of spaced longitudinal members connected adjacent their opposite ends by downwardly opening substantially U-shaped transverse members, said transverse members being adapted to engage the running gear of said vehicle and support the frame thereon, lifting arms pivotally connected to said frame for engaging and lifting the forward portion of said vehicle body, means on said frame for actuating said lifting arms, and means attached to the underside of said vehicle body for slidably contacting said arms.

8. Dumping apparatus adapted to be mounted as a unit between the body and running gear of a vehicle comprising a frame formed of spaced longitudinal members connected adjacent their opposite ends by transverse members, said transverse members being adapted to engage the running gear of said vehicle and support said frame thereon, lifting arms extending transversely of and pivotally connected to said frame for lifting the forward portion of said vehicle body, and means on said frame for actuating said lifting arms.

9. Dumping apparatus adapted to be mounted as a unit between the body and running gear of a vehicle comprising a frame formed of spaced longitudinal members connected adjacent their opposite ends by front and rear transverse spacers, said transverse spacers being adapted to engage said running gear and support said frame thereon, a supporting member carried on said front spacer, lifting arms extending transversely of said frame and pivotally connected to said supporting member for lifting the forward portion of said body, and means on said frame for actuating said lifting arms.

10. Dumping apparatus adapted to be mounted as a unit between the body and running gear of a vehicle comprising a frame formed of spaced longitudinal members connected adjacent their opposite ends by front and rear transverse spacers, said transverse spacers being adapted to engage said running gear and support said frame thereon, a supporting member rotatably mounted on said front spacer, lifting arms extending transversely of said frame and pivotally connected to said supporting member, means on said body for guiding said arms, and means on said frame for actuating said lifting arms.

11. Dumping apparatus adapted to be mounted as a unit between the body and running gear of a vehicle comprising a frame formed of spaced longitudinal members connected adjacent their opposite ends by transverse front and rear spacers, said spacers being partly cylindrical and having concave lower faces for embracing and supporting said frame on longitudinally spaced cross ties of said running gear, a supporting member mounted on said front spacer and having a cylindrically concave lower face substantially coaxial with the upper face of said front spacer, a pair of lifting arms pivotally connected to said supporting member adjacent each of its ends and extending inwardly thereof transversely of said frame for lifting the forward portion of said body, means hingedly attached to the underside of said body for guiding said arms, means for rotatably connecting the rear portion of said body to said rear spacer, means on said frame for extending said arms and causing said supporting member to rotate relative to said front spacer, and means associated with said frame for operating said extending means.

12. Dumping apparatus adapted to be mounted as a unit between the body and running gear of a vehicle comprising a frame formed of spaced longitudinal members connected adjacent their opposite ends by transverse members, a tubular supporting member extending transversely across said frame intermediate said transverse members, spaced lifting arms pivotally mounted on said supporting member adjacent ends thereof, fluid pressure means on said frame for actuating said lifting means, and fluid pressure means mounted within and disposed axially of said supporting member for operating said actuating means.

HENRY HENKE.

REFERENCES CITED

The following references are of record in the file of this patent:

UNITED STATES PATENTS

| Number | Name | Date |
| --- | --- | --- |
| 1,394,113 | Page | Oct. 18, 1921 |
| 1,906,302 | Anthony | May 2, 1933 |
| 2,162,831 | Barrett | June 20, 1939 |